United States Patent
Yoshioka (10) Patent No.: US 7,143,577 B2
(45) Date of Patent: Dec. 5, 2006

(54) AIR-FUEL RATIO CONTROL APPARATUS OF INTERNAL COMBUSTION ENGINE

(75) Inventor: Mamoru Yoshioka, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 46 days.

(21) Appl. No.: 11/002,470

(22) Filed: Dec. 3, 2004

(65) Prior Publication Data

US 2005/0120710 A1   Jun. 9, 2005

(30) Foreign Application Priority Data

Dec. 5, 2003   (JP)   ............... 2003-406782

(51) Int. Cl.
F01N 3/00   (2006.01)
(52) U.S. Cl. ............... 60/285; 60/276; 60/286; 123/326; 123/675; 123/481; 123/198 F
(58) Field of Classification Search ............ 60/284, 60/285, 276, 286; 123/325, 326, 675, 682, 123/481, 198 F
See application file for complete search history.

(56) References Cited

U.S. PATENT DOCUMENTS

| | | | | |
|---|---|---|---|---|
| 6,148,611 A | * | 11/2000 | Sato | ............... 60/274 |
| 6,405,527 B1 | * | 6/2002 | Suzuki et al. | ............... 60/285 |
| 6,539,707 B1 | * | 4/2003 | Ikemoto et al. | ............... 60/285 |
| 6,622,478 B1 | * | 9/2003 | Nakamura | ............... 60/285 |
| 6,978,204 B1 | * | 12/2005 | Surnilla et al. | ............... 701/103 |

FOREIGN PATENT DOCUMENTS

| | | |
|---|---|---|
| JP | A 59-173533 | 10/1984 |
| JP | A 63-117139 | 5/1988 |
| JP | A 63-134835 | 7/1988 |
| JP | A 6-307271 | 11/1994 |

* cited by examiner

*Primary Examiner*—Binh Q. Tran
(74) *Attorney, Agent, or Firm*—Oliff & Berridge, PLC (57) ABSTRACT

An air-fuel ratio control apparatus of an internal combustion engine in which an exhaust gas purifying catalyst is disposed in an exhaust passage, comprises: fuel cut means which stops fuel supply to the internal combustion engine when it is determined that a number of revolutions of the internal combustion engine is higher than a fuel cut number of revolutions at the time of deceleration of the internal combustion engine; and changing means of the fuel cut number of revolutions for changing the fuel cut number of revolutions according to a physical amount which correlates with an amount of oxygen discharged from the exhaust gas purifying catalyst during the fuel increasing operation of the internal combustion engine such that as the amount of oxygen is greater, the fuel cut number of revolutions is reduced.

6 Claims, 9 Drawing Sheets

AIR-FUEL RATIO CONTROL APPARATUS OF INTERNAL COMBUSTION ENGINE

BACKGROUND OF THE INVENTION

The present invention relates to an air-fuel ratio control apparatus of an internal combustion engine.

There is known an air-fuel ratio control apparatus of an internal combustion engine in which when fuel of the internal combustion engine is increased and output of an oxygen concentration sensor provided downstream from a catalytic converter shows rich, an air-fuel ratio is controlled to a lean side during a predetermined time and then, the air-fuel ratio is returned to a theoretical air-fuel ratio (see Japanese Patent Application Laid-open (JP-A) No. 63-117139). As other arts related to the present invention, there are patent documents JP-A Nos. 63-134835, 6-307271, and 59-173533.

When CO or HC exists in exhaust gas, the exhaust gas purifying catalyst oxidizes CO or HC using occluded oxygen or oxygen in the exhaust gas. When oxide component such as NOx is included in the exhaust gas, the exhaust gas purifying catalyst reduces the oxide component using HC or CO in the exhaust gas, thereby purifying the exhaust gas. In order to meet the requirement of enhanced emission control, a capacity of catalyst of the exhaust gas purifying catalyst mounted in a vehicle or the like is increased. Therefore, in the conventional air-fuel ratio control, after fuel increasing operation of the internal combustion engine, the amount of oxygen occluded in the exhaust gas purifying catalyst until the vehicle decelerates or stops is small, and there is an adverse possibility that generation of a catalyst exhaust odor (concretely, an odor of hydrogen sulfide ($H_2S$)) cannot be suppressed.

SUMMARY OF THE INVENTION

It is an object of the present invention to provide an air-fuel ratio control apparatus of an internal combustion engine in which sufficient amount of oxygen to suppress the catalyst exhaust smell can reliably be occluded in an exhaust gas purifying catalyst until the internal combustion engine is decelerated or stopped after the fuel increasing operation of the internal combustion engine.

To solve the above problem, the present invention provides an air-fuel ratio control apparatus of an internal combustion engine in which an exhaust gas purifying catalyst is disposed in an exhaust passage, comprising: fuel cut means which stops fuel supply to the internal combustion engine when it is determined that a number of revolutions of the internal combustion engine is higher than a fuel cut number of revolutions at the time of deceleration of the internal combustion engine; and changing means of the fuel cut number of revolutions for changing the fuel cut number of revolutions according to a physical amount which correlates with an amount of oxygen discharged from the exhaust gas purifying catalyst during a fuel increasing operation of the internal combustion engine such that as the amount of oxygen is greater, the fuel cut number of revolutions is reduced.

Since exhaust gas of the rich air-fuel ratio including CO and HC flows into the exhaust gas purifying catalyst during the fuel increasing operation, oxygen is discharged from the exhaust gas purifying catalyst. If the fuel supply to the internal combustion engine is stopped by the fuel cut means, the concentration of oxygen in the exhaust gas becomes substantially equal to the concentration of oxygen in the air, so that the oxygen is occluded in the exhaust gas purifying catalyst. According to the air-fuel ratio control apparatus of the internal combustion engine of the present invention, since the changing means of the fuel cut number of revolutions reduces the fuel cut number of revolutions as the amount of discharged oxygen during the fuel increasing operation is increased, the stop of the fuel supply by the fuel cut means can be easily carried out. Thus, when the internal combustion engine is decelerated, more oxygen can be occluded in the exhaust gas purifying catalyst. Therefore, sufficient amount of oxygen to suppress the catalyst exhaust odor can reliably be occluded in the exhaust gas purifying catalyst until the internal combustion engine is decelerated or stopped after the fuel increasing operation.

In the air-fuel ratio control apparatus of the invention, the changing means of the fuel cut number of revolutions may refer to a total intake air amount of the internal combustion engine during the fuel increasing operation as the physical amount, and may change the fuel cut number of revolutions according to the total intake air amount such that as the total intake air amount is greater, the fuel cut number of revolutions is reduced. When the amount of the total intake air during the fuel increasing operation is high, a large amount of exhaust gas having rich air-fuel ratio flows into the exhaust gas purifying catalyst, so that more oxygen is discharged from the exhaust gas purifying catalyst. Thus, the fuel cut number of revolutions is reduced as the total intake air amount becomes greater, so that it becomes easy to carry out the stop of the fuel supply at the time of deceleration. Accordingly, more oxygen can be occluded in the exhaust gas purifying catalyst. Therefore, it is possible to suppress the generation of $H_2S$. When the total intake air amount is small, i.e., when the amount of oxygen discharged from the exhaust gas purifying catalyst is small, the fuel cut number of revolutions is increased and it becomes difficult to carry out the stop of the fuel supply, so that the environment around the exhaust gas purifying catalyst is hard to be an oxygen excessive state. Since the deterioration of the catalyst is promoted in an environment in which the temperature is high and excessive oxygen exists, if it becomes difficult to stop the fuel supply, the deterioration of the exhaust gas purifying catalyst is suppressed.

In the air-fuel ratio control apparatus of the invention, the changing means of the fuel cut number of revolutions may refer to, as the physical amount, a period during which the fuel increasing operation is carried out, and may change the fuel cut number of revolutions according to the period such that as the period is longer, the fuel cut number of revolutions is reduced. If the fuel increasing operation period becomes long, time during which the exhaust gas having rich air-fuel ratio flows into the exhaust gas purifying catalyst also becomes long and thus, more oxygen is discharged from the exhaust gas purifying catalyst. Thereupon, the fuel cut number of revolutions is reduced as the fuel increasing operation period is longer, so that more oxygen is occluded in the exhaust gas purifying catalyst. By changing the fuel cut number of revolutions in this manner, it is possible to allow the exhaust gas purifying catalyst to occlude the oxygen of such amount that the generation of $H_2S$ can be suppressed while suppressing the deterioration of the exhaust gas purifying catalyst.

In the air-fuel ratio control apparatus of the invention, the changing means of the fuel cut number of revolutions may refer to an air-fuel ratio at the time of the fuel increasing operation as the physical amount, and may change the fuel cut number of revolutions such that as a change of the air-fuel ratio toward a rich side is greater, the fuel cut number of revolutions becomes smaller. Since the amount of each of CO and HC flowing into the exhaust gas purifying catalyst during the fuel increasing operation is increased as the change of the air-fuel ratio toward the rich side during the fuel increasing operation is greater, more oxygen is discharged from the exhaust gas purifying catalyst. As the change of the air-fuel ratio toward the rich side is greater, the fuel cut number of revolutions is reduced, so that more oxygen is occluded in the exhaust gas purifying catalyst at the time of deceleration. By changing the fuel cut number of revolutions in this manner, it is possible to allow the exhaust gas purifying catalyst to occlude the oxygen of such amount that the generation of $H_2S$ can be suppressed while suppressing the deterioration of the exhaust gas purifying catalyst.

In the air-fuel ratio control apparatus of the invention, the changing means of the fuel cut number of revolutions may correct the fuel cut number of revolutions according to an amount of oxygen supplied to the exhaust gas purifying catalyst after completing the fuel increasing operation such that as the amount of oxygen supplied to the exhaust gas purifying catalyst is greater, the fuel cut number of revolutions is increased. When the internal combustion engine is operated at the stoichiometric air-fuel ratio after the fuel increasing operation or when the fuel supply is stopped, oxygen is supplied to the exhaust gas purifying catalyst. If the amount of supplied oxygen to the exhaust gas purifying operation is great, it is possible to reduce the amount of oxygen to be supplied to the exhaust gas purifying catalyst at the time of deceleration. Thereupon, the correction is made such as to increase the fuel cut number of revolutions, so that as the amount of supplied oxygen is greater, it becomes more difficult to carry out the stop of the fuel supply by the fuel cut means. By correcting the fuel cut number of revolutions in this manner, it is possible to suppress the deterioration of the exhaust gas purifying catalyst more effectively.

In the air-fuel ratio control apparatus of the invention, the changing means of the fuel cut number of revolutions may correct the fuel cut number of revolutions according to a maximum oxygen occluding amount of the exhaust gas purifying catalyst such that as the maximum oxygen occluding amount is greater, the fuel cut number of revolutions is reduced. By correcting the fuel cut number of revolutions in this manner, it is possible to supply the oxygen in an amount suitable for the maximum oxygen occluding amount can be supplied to the exhaust gas purifying catalyst at the time of deceleration.

DESCRIPTION OF THE PREFERRED EMBODIMENTS

Figure 1:
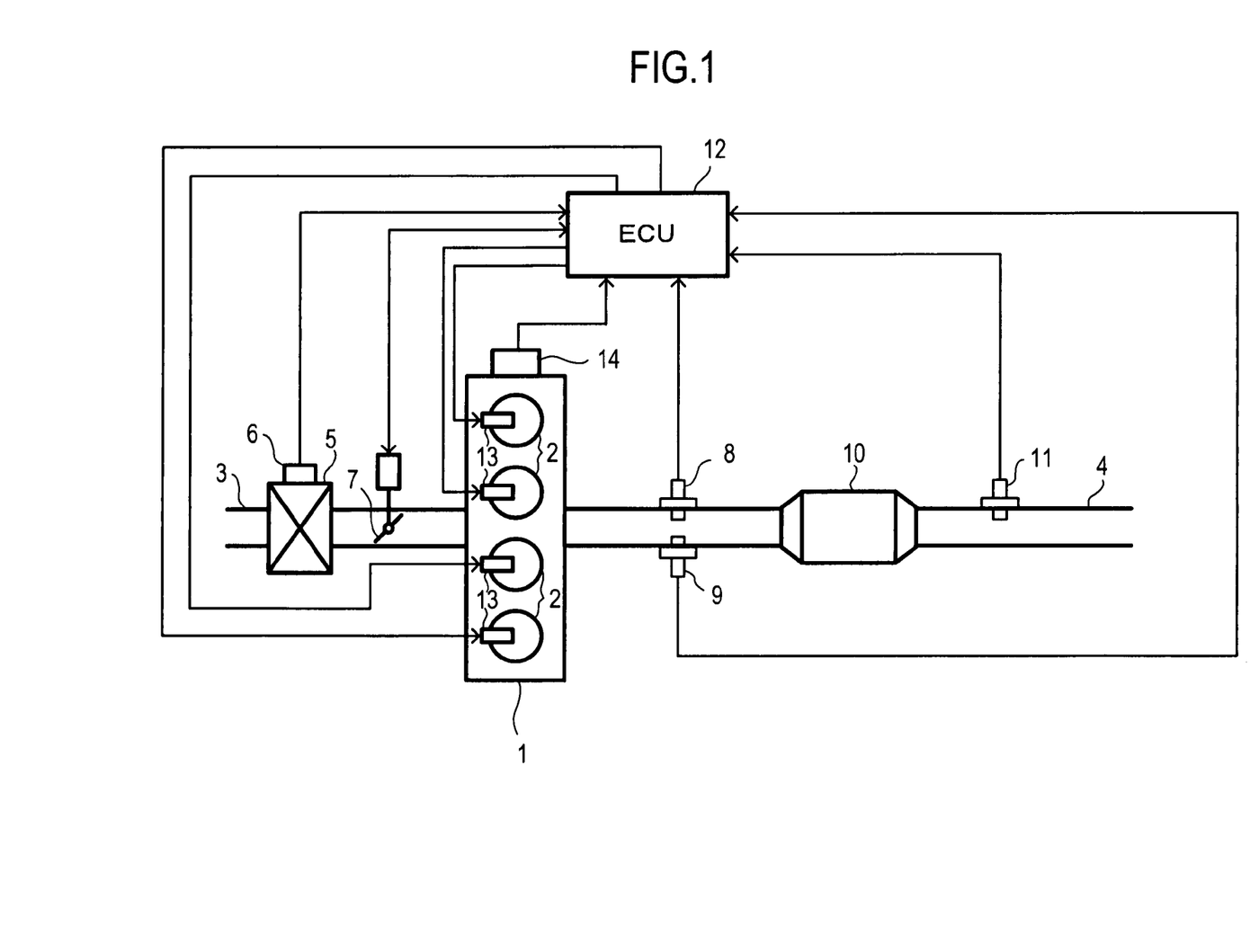
FIG. 1 shows an embodiment of an internal combustion engine to which an air-fuel ratio control apparatus of the present invention is applied.

FIG. 1 shows an embodiment of an internal combustion engine to which an air-fuel ratio control apparatus of the present invention is applied. The internal combustion engine 1 has a plurality of (four in FIG. 1) cylinders 2. As is well known, an intake passage 3 and an exhaust passage 4 are connected to the internal combustion engine 1. The intake passage 3 is provided with an air filter 5 for filtering intake air, an air flow sensor 6 which outputs a signal corresponding to the amount of the intake air, and a throttle valve 7 for adjusting the intake air. The exhaust passage 4 is provided with an air-fuel ratio sensor 8 which outputs a signal corresponding to the amount of the exhaust gas discharged from the internal combustion engine 1, an exhaust gas temperature sensor 9 which outputs a signal corresponding to the temperature of the exhaust gas, an exhaust gas purifying catalyst 10, and an oxygen concentration sensor 11 which outputs a signal corresponding to the oxygen concentration in the exhaust gas. Three way catalyst, NOx occlusion-reduction catalyst or the like is used as the exhaust gas purifying catalyst 10.

The operation state of the internal combustion engine 1 is controlled by an engine control unit (ECU) 12. The ECU 12 is constituted as a computer comprising a combination of a microprocessor and peripheral devices such as a ROM, a RAM and the like which are necessary for the operation of the microprocessor. The ECU 12 referrers to outputs of the air-fuel ratio sensor 8 and the oxygen concentration sensor 11 for example and controls the operation of a fuel injection valve 13 provided for each cylinder 2, and supplies an appropriate amount of fuel to each cylinder 2 such that the air-fuel ratio of the exhaust gas becomes equal to a target air-fuel ratio. When the ECU 12 determines that the number of revolutions of the internal combustion engine 1 is higher than the fuel cut starting number of revolutions (e.g., 1000 rpm) at the time of deceleration of the internal combustion engine 1, the ECU 12 stops the fuel to be supplied to the internal combustion engine 1. Hereinafter, such fuel cut operation may be referred to as a F/C. By carrying out the F/C, the ECU 12 functions as a fuel cut means. In addition, a crank angle sensor 14 which outputs a signal corresponding to a crank angle of the internal combustion engine 1 is connected to the ECU 12.

Figure 2:
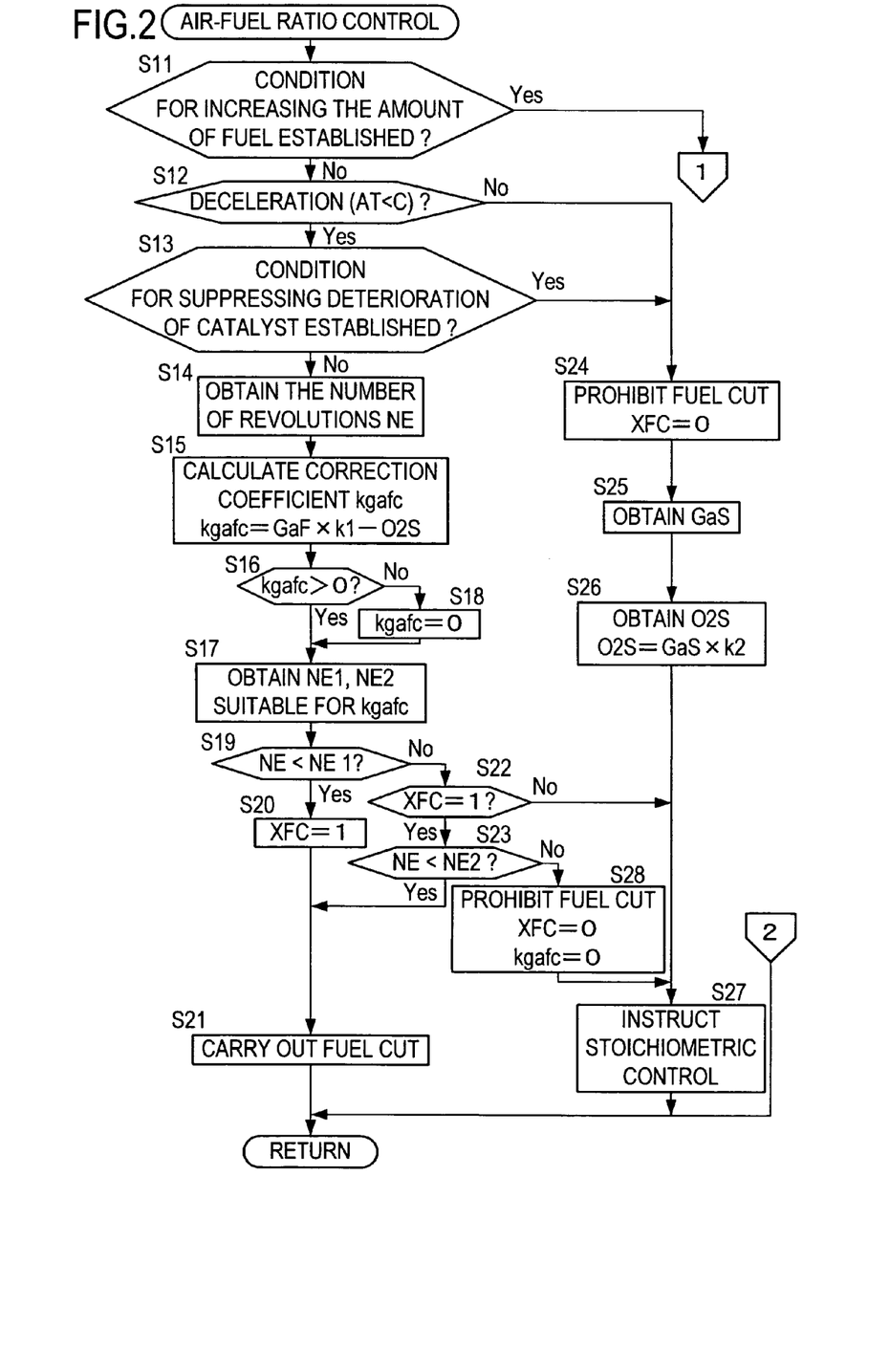
FIG. 2 is a flowchart showing the first embodiment of a control routine of an air-fuel ratio which is carried out by an ECU.
Figure 3:
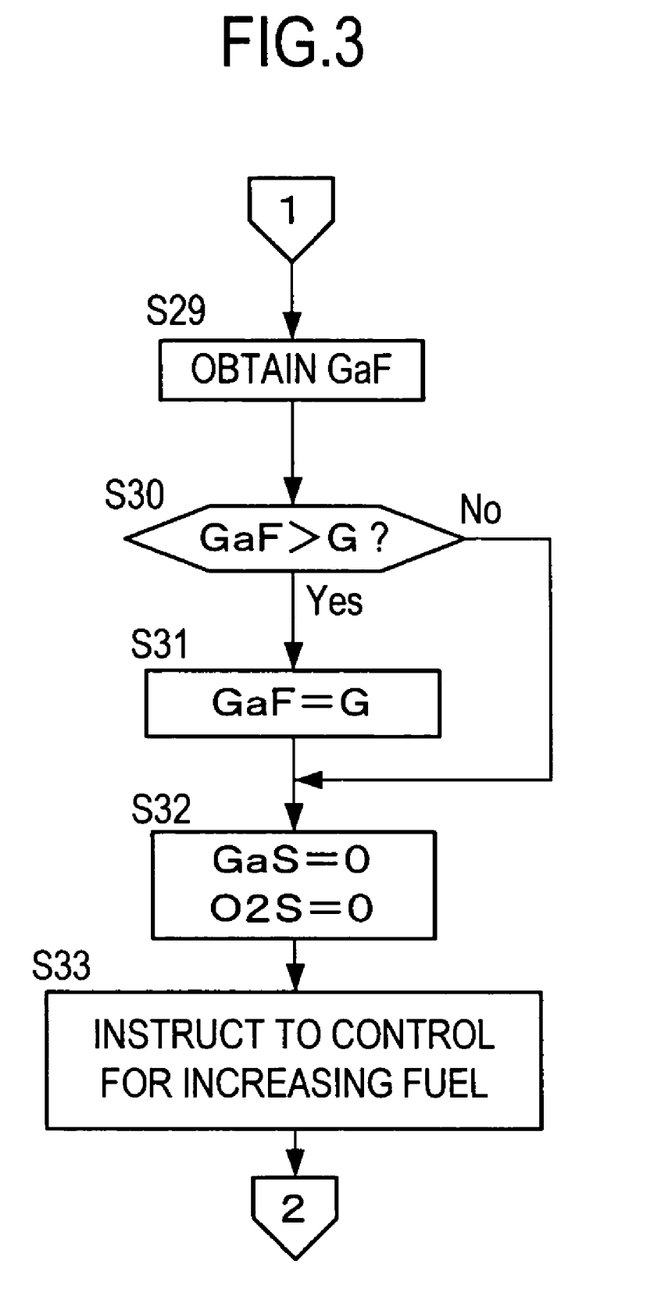
FIG. 3 is a flowchart following FIG. 2.

FIGS. 2 and 3 are flowcharts showing the first embodiment of a control routine of the air-fuel ratio which is carried out by the ECU 12 to control the air-fuel ratio of the internal combustion engine 1. The control routine of the air-fuel ratio shown in FIGS. 2 and 3 is repeatedly carried out at predetermined cycle during the operation of the internal combustion engine 1.

In the air-fuel ratio control routine shown in FIG. 2, the ECU 12 first determines in step S11 whether a fuel amount increasing condition for increasing the amount of fuel to be supplied to the internal combustion engine 1 is established. The fuel amount increasing condition is established, for example, when the increase of the output of the internal combustion engine 1 is required. If it is determined that the fuel amount increasing condition is not established, the procedure is proceeded to step S12, where the ECU 12 determines whether the internal combustion engine 1 is in a decelerated state. If the opening of the throttle valve 7, or TA is less than a predetermined opening C, it is determined that the internal combustion engine 1 is in the decelerated state. The predetermined opening C is set to a value which is slightly greater than an opening when the internal combustion engine 1 is idling. If it is determined that the internal combustion engine 1 is in the decelerated state, the procedure is proceeded to step S13, where the ECU 12 determines whether a catalyst deterioration suppressing condition is established. The catalyst deterioration suppressing condition is established, for example, if the temperature of the catalyst 10 is higher than a predetermined criteria temperature (e.g., 800° C.). If it is determined that the catalyst deterioration suppressing condition is not established, the procedure is proceeded to step S14 where the ECU 12 obtains the number of revolutions NE of the internal combustion engine 1. The number of revolutions NE can be obtained by the output of the crank angle sensor 14. In next step S15, the ECU 12 calculates correction coefficient kgafc for correcting the fuel cut starting number of revolutions NE1 for determining whether the fuel cut should be started and for correcting the fuel cut completing number of revolutions NE2 for determining whether the fuel cut should be completed. The correction coefficient kgafc is obtained by subtracting O2S which is an amount of oxygen supplied to the catalyst 10 in a period during which the internal combustion engine 1 is operated at a stoichiometric air-fuel ratio after the fuel increasing operation of the internal combustion engine 1, from a value obtained by multiplying, by a coefficient K1, the total intake air amount GaF of the internal combustion engine 1 during the fuel increasing operation of the internal combustion engine 1. The coefficient k1 can be obtained in later-described step S29. The coefficient k1 is for estimating, from GaF, the total value of the oxygen amount discharged from the catalyst 10 during the fuel increasing operation. Thus, the correction coefficient kgafc is increased as the GaF is increased and the amount of oxygen discharged from the catalyst 10 during the fuel increasing operation, and the correction coefficient kgafc is reduced as the amount of oxygen supplied to the catalyst 10 after the fuel increasing operation is increased.

Figure 4:
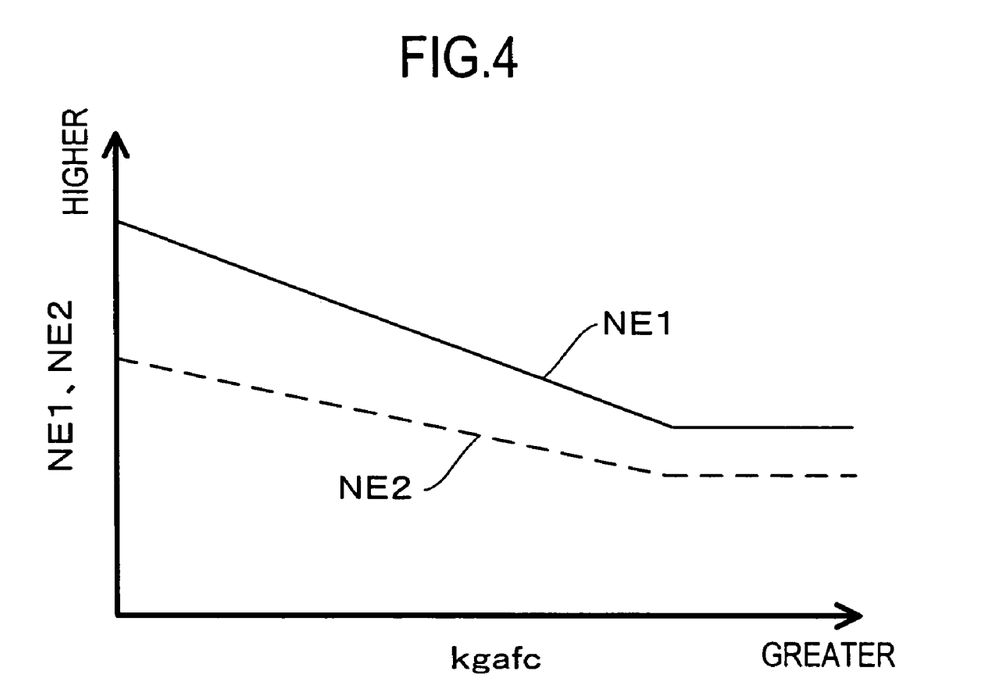
FIG. 4 shows one example of a relationship between a correction coefficient and the fuel cut starting number of revolutions and the fuel cut completing number of revolutions.

In subsequent step S16, the ECU 12 determines whether kgafc is greater than 0. If the ECU 12 determines that kgafc is greater than 0, the procedure is proceeded to step S17, where NE1 and NE2 corresponding to kgafc are obtained. If the ECU 12 determines that kgafc is equal to or less than 0, the procedure is proceeded to step S18, where 0 is substituted into kgafc and then, the procedure is proceeded to step S17. The NE1 and NE2 can be obtained by storing the relationship between the NE1 and NE2 and kgafc shown in FIG. 4 in the ROM of the ECU 12 as a map, and by referring to the map. As apparent from FIG. 4, the NE1 and NE2 are set such that as kagfc becomes greater, the NE1 and NE2 become lower. In step S19, ECU 12 determines whether NE is greater than NE1. If the ECU 12 determines that NE is greater than NE1, the procedure is proceeded to step S20, where the ECU 12 substitutes 1 which indicates that the fuel cut is being carried out, into XFC which is a flag showing whether the fuel cut is being carried out. In step S21, the ECU 12 instructs the internal combustion engine 1 to carry out the fuel cut. Then, this control routine is completed.

If the ECU 12 determines that NE is equal to or less than NE1 in step S19, the procedure is proceeded to step S22, where the ECU 12 determines whether XFC is 1. If the ECU 12 determines that XFC is 1 (fuel cut is being carried out), the procedure is proceeded to step S22, where the ECU 12 determines whether NE is greater than NE2. If the ECU 12 determines that NE is greater than NE2, the procedure is proceeded to step S21, where the ECU 12 instructs the internal combustion engine 1 to carry out the fuel cut. Then, this control routine is completed.

If the ECU 12 determines in step S12 that the internal combustion engine 1 is not in the decelerated state or the ECU 12 determines in step S13 that the catalyst deterioration suppressing condition is established, the procedure is proceeded to step S24, where the ECU 12 prohibits the fuel cut. The ECU 12 substitutes 0 indicating that the fuel cut is not carried out, into XFC. In next step S25, the ECU 12 obtains the total intake air amount GaS in the stoichiometric operation period during which the internal combustion engine 1 is operated with the stoichiometric air-fuel ratio after the fuel increasing operation. The GaS can be obtained by totalizing the outputs of the air flow sensor 6 during the stoichiometric operation for example. In step S26, the ECU 12 multiplies GaS by a coefficient k2 to obtain O2S. The coefficient k2 is set to a value which converts GaS into O2S. The values of GaS and O2S are stored in the RAM of the ECU 12, and even if the current control routine has been completed, the last values of GaS and O2S are maintained until new values are substituted. In next step S27, the ECU 12 instructs to control the stoichiometric air-fuel ratio such that the air-fuel ratio of the internal combustion engine 1 becomes the stoichiometric air-fuel ratio. Then, the current control routine is completed. If the ECU 12 determines that NE is equal to or less than NE 2 in step S23, the procedure is proceeded to step S28 and the ECU 12 prohibits the fuel cut. The ECU 12 substitutes 0 into XFC and kgafc. Thereafter, in step S27, the ECU 12 instructs the internal combustion engine 1 to control the stoichiometric air-fuel ratio and then, the current control routine is completed.

If the ECU 12 determines that the fuel amount increasing condition is established in step S11, the procedure is proceeded to step S29 shown in FIG. 3, and the ECU 12 obtains GaF. The GaF can be obtained by totalizing the outputs of the air flow sensor 6 during the fuel increasing operation of the internal combustion engine 1. The value of GaF is stored in the RAM of the ECU 12, and even if the current control routine has been completed, the last value of the GaF is maintained until a new value thereof is substituted. In following next step S30, the ECU 12 determines whether GaF is greater than a predetermined guard value G. The guard value G is set to an appropriate value such that NE1 by which the start of the fuel cut is determined is not extremely lowered. If it is determined that the GaF is greater than the guard value G, the procedure is proceeded to step S31, where the ECU 12 substitutes the guard value G into GaF. In next step S32, the ECU 12 substitutes 0 into GaS and O2S to initialize the values. If it is determined that GaF is equal to or less than the guard value G, step S31 is skipped, and the processing of step S32 is carried out. In next step S33, the ECU 12 instructs the internal combustion engine 1 to increase the amount of fuel. Then, the current control routine is completed.

By carrying out the control routine shown in FIGS. 2 and 3 in this manner, the ECU 12 changes NE1 and NE2 such that oxygen is appropriately occluded in the catalyst 10 by the fuel cut at the time of deceleration according to the oxygen amount discharged from the catalyst 10. By changing the NE1 and NE2 in this manner, an amount of oxygen that can suppress the generation of $H_2S$ can be occluded in the catalyst 10 until the internal combustion engine 1 is decelerated or stopped while suppressing the deterioration of the catalyst 10. A parameter that is used to estimate the amount of oxygen (amount of discharged oxygen) discharged from the catalyst 10 is not limited to the total intake air amount. For example, it is possible to estimate the amount of discharged oxygen using time during which the fuel increasing operation is carried out or an air-fuel ratio at the time of fuel increasing operation. As the time of the fuel increasing operation is longer, or as the change of the air-fuel ratio toward the rich-side is greater, the amount of discharged oxygen is increased. Thus, in this case, the ECU 12 reduces the NE1 and NE2. By carrying out the air-fuel ratio control routine shown in FIGS. 2 and 3 in this manner, the ECU 12 functions as means for changing the fuel cut number of revolutions.

Figure 5:
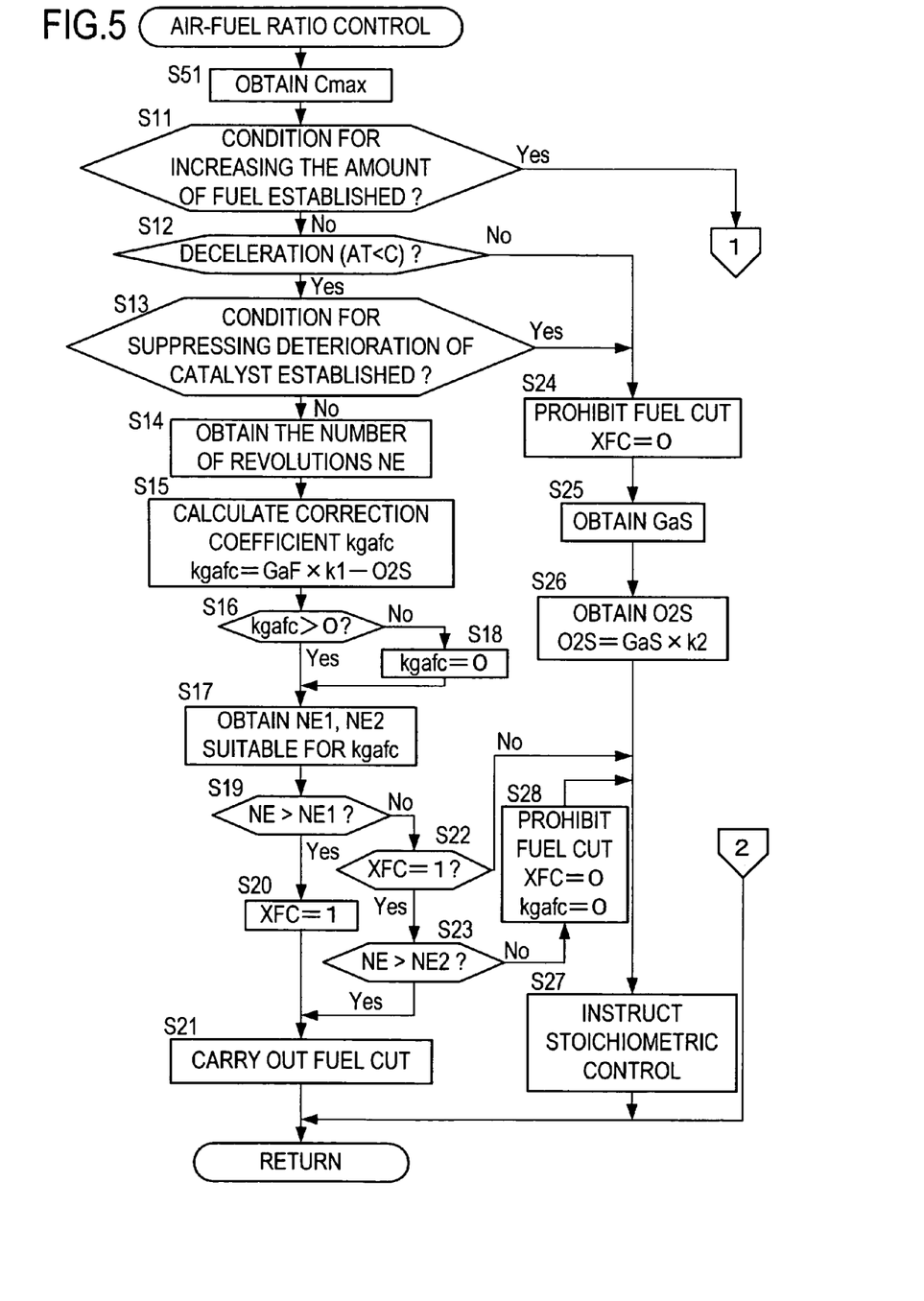
FIG. 5 is a flowchart showing the second embodiment of a control routine of the air-fuel ratio carried out by the ECU.
Figure 6:
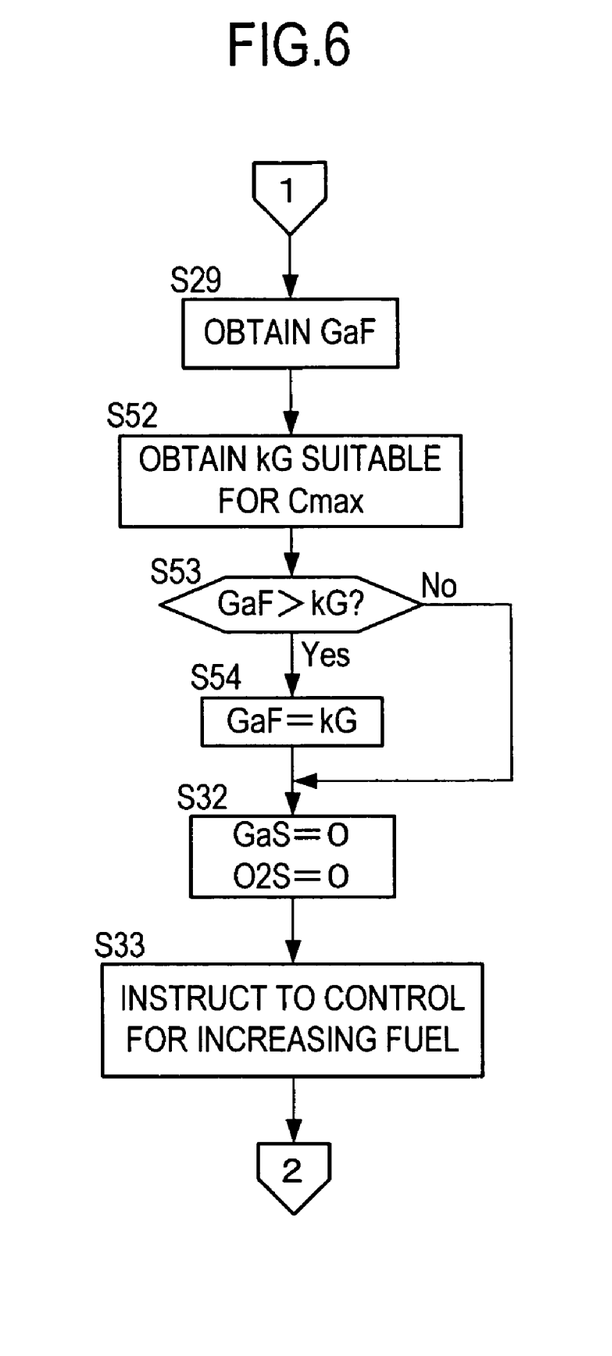
FIG. 6 is a flowchart following FIG. 5.

FIGS. 5 and 6 are flowcharts showing the second embodiment of the air-fuel ratio control routine which is carried out by the ECU 12. The air-fuel ratio control routine in FIGS. 5 and 6 is repeatedly carried out at predetermined intervals during operation of the internal combustion engine 1. In FIGS. 5 and 6, the same processing is designated with the same step numbers as that of the FIGS. 2 and 3, and explanation thereof will be omitted.

In the air-fuel ratio control routine shown in FIG. 5, the ECU 12 first obtains a maximum oxygen occluding amount Cmax of the catalyst 10 in step S51. The Cmax is calculated by a Cmax calculation routine which is different from the air-fuel ratio control routine, and the Cmax is stored in the RAM of the ECU 12. The Cmax can be obtained by the following method for example. When the internal combustion engine 1 is operated in a substantially steady state in a partial load region, rich control for bringing the air-fuel ratio of the internal combustion engine 1 to rich side is carried out to discharge oxygen from the catalyst 10, thereby bringing the oxygen occluding amount to 0. When the output of the oxygen concentration sensor 11 is brought toward the rich side, it is possible to determine that the occluding amount of oxygen of the catalyst 10 becomes 0. Next, lean control for bringing the air-fuel ratio of the internal combustion engine 1 to lean side is carried out to allow the catalyst 10 to occlude the oxygen up to the Cmax. In this case, when the output of the oxygen concentration sensor 11 is brought toward the lean side, it is possible to determine that the oxygen occluding amount of the catalyst 10 becomes Cmax. The Cmax can be obtained by multiplying the amount of air drawn into the internal combustion engine 1 between the instant when the lean control of the internal combustion engine 1 is carried out to the instant when the output of the oxygen concentration sensor 11 becomes lean, by a difference (excessive oxygen) between the air-fuel ratio detected by the air-fuel ratio sensor 8 during the lean control and the stoichiometric air-fuel ratio, and by totalizing the values obtained by the multiplication.

Figure 7:
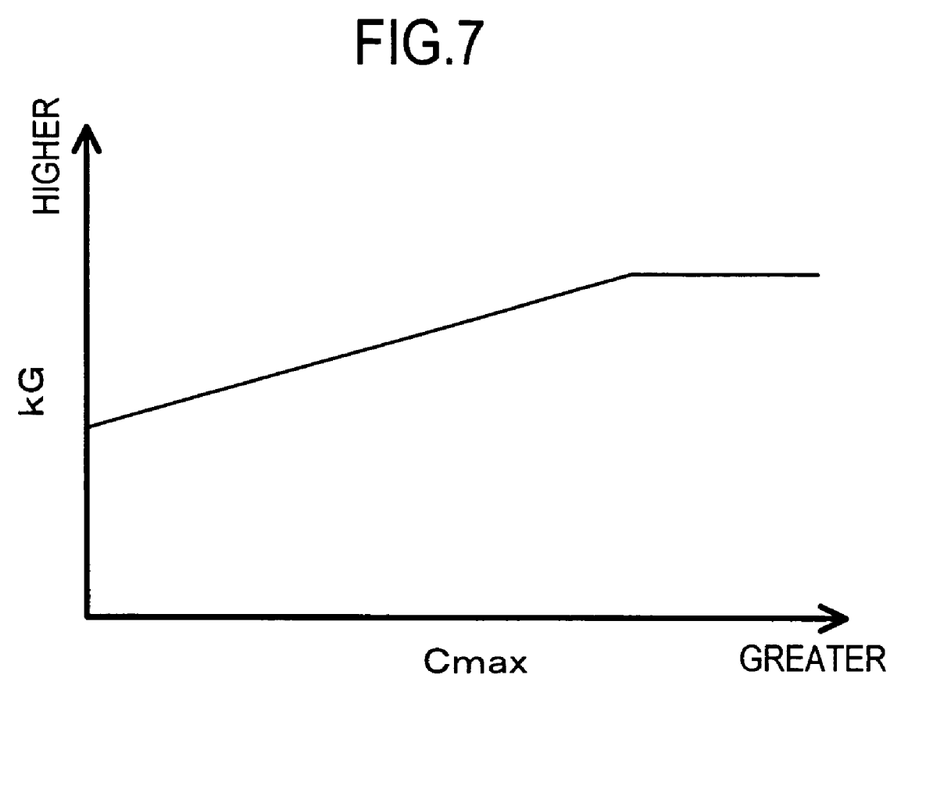
FIG. 7 shows one example of a relationship between a maximum oxygen occluding amount of a catalyst and a catalyst reduction criteria value.

In next step S11, the ECU 12 determines whether the fuel amount increasing condition is established. If it is determined that the fuel amount increasing condition is not established, the same processing as that of the air-fuel ratio control routine shown in FIG. 2 is carried out and then, the current control routine is completed. If it is determined that the fuel amount increasing condition is established, the procedure is proceeded to step S29 shown in FIG. 6, where the ECU 12 obtains GaF. In following step S52, the ECU 12 obtains the catalyst reduction criteria value kG corresponding to Cmax. The catalyst reduction criteria value kG can be obtained by storing the relationship between Cmax and kG in the ROM of the ECU 12 as a map, and by referring to the map. As apparent from FIG. 7, kG is set such that as Cmax becomes greater, kG becomes higher.

In next step S53, the ECU 12 determines whether GaF is greater than kG. If it is determined that GaF is greater than kG, the procedure is proceeded to step S54, where the ECU 12 substitutes kG into GaF. Then, the ECU12 carries out the processing in steps S32 and S33, and the current control routine is completed. If it is determined that GaF is equal to or less than kG in step S53, step S54 is skipped and the procedure is proceeded to step S32, where the same processing is carried out and then, the current control routine is completed.

As explained above, in the air-fuel ratio control routine shown in FIGS. 5 and 6, kG is changed by Cmax, and as Cmax is greater, the upper limit value of the GaF is increased. Thus, as the Cmax is greater, the upper limit value of kgafc is increased, and NE1 and NE2 are changed to low rotation regions. By correcting the change of the NE1 and NE2 by Cmax in this manner, it is possible to appropriately occlude oxygen according to the occlusion amount of oxygen of the catalyst 10.

Figure 8:
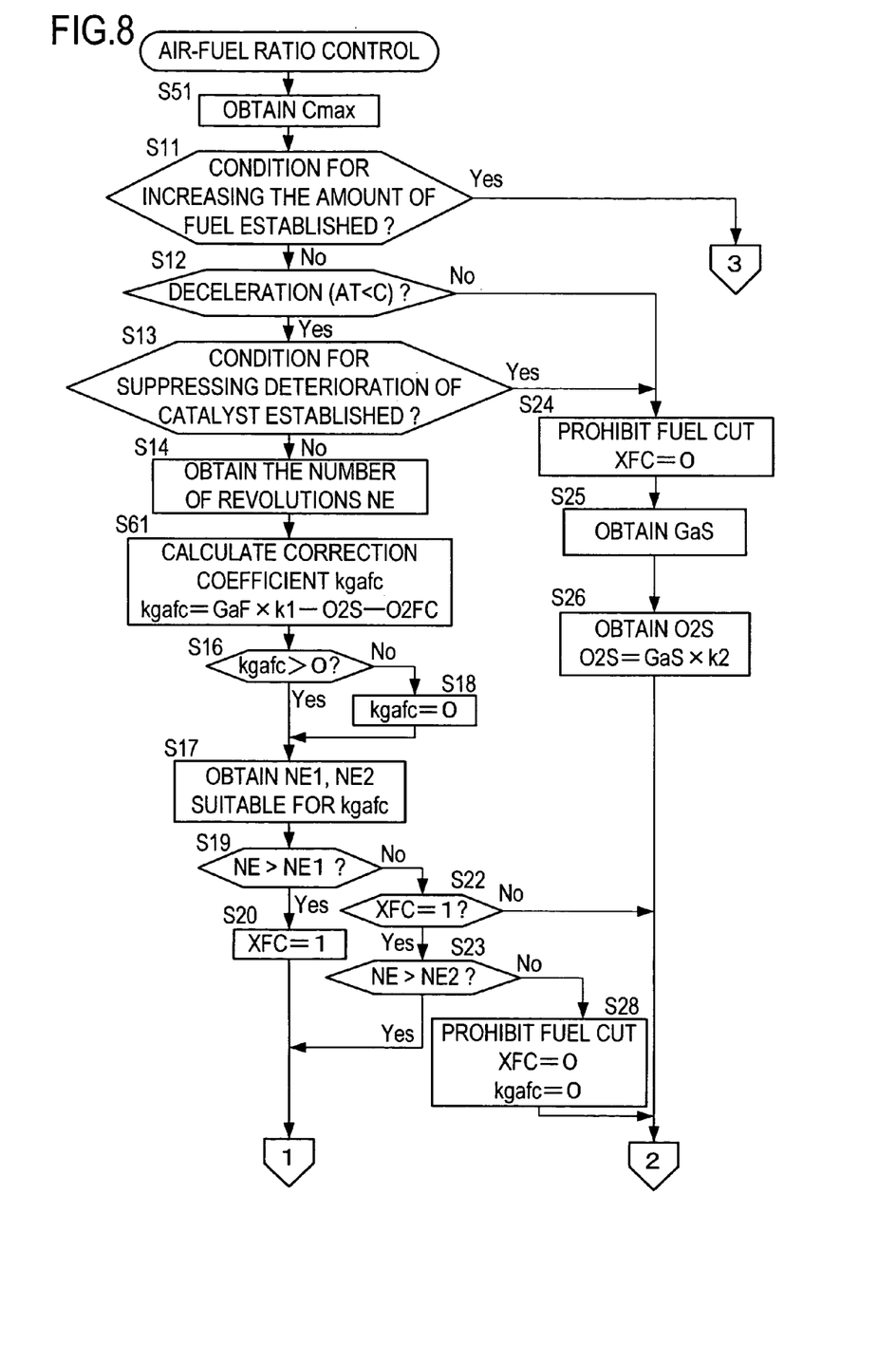
FIG. 8 is a flowchart showing the third embodiment of a control routine of an air-fuel ratio which is carried out by an ECU.
Figure 9:
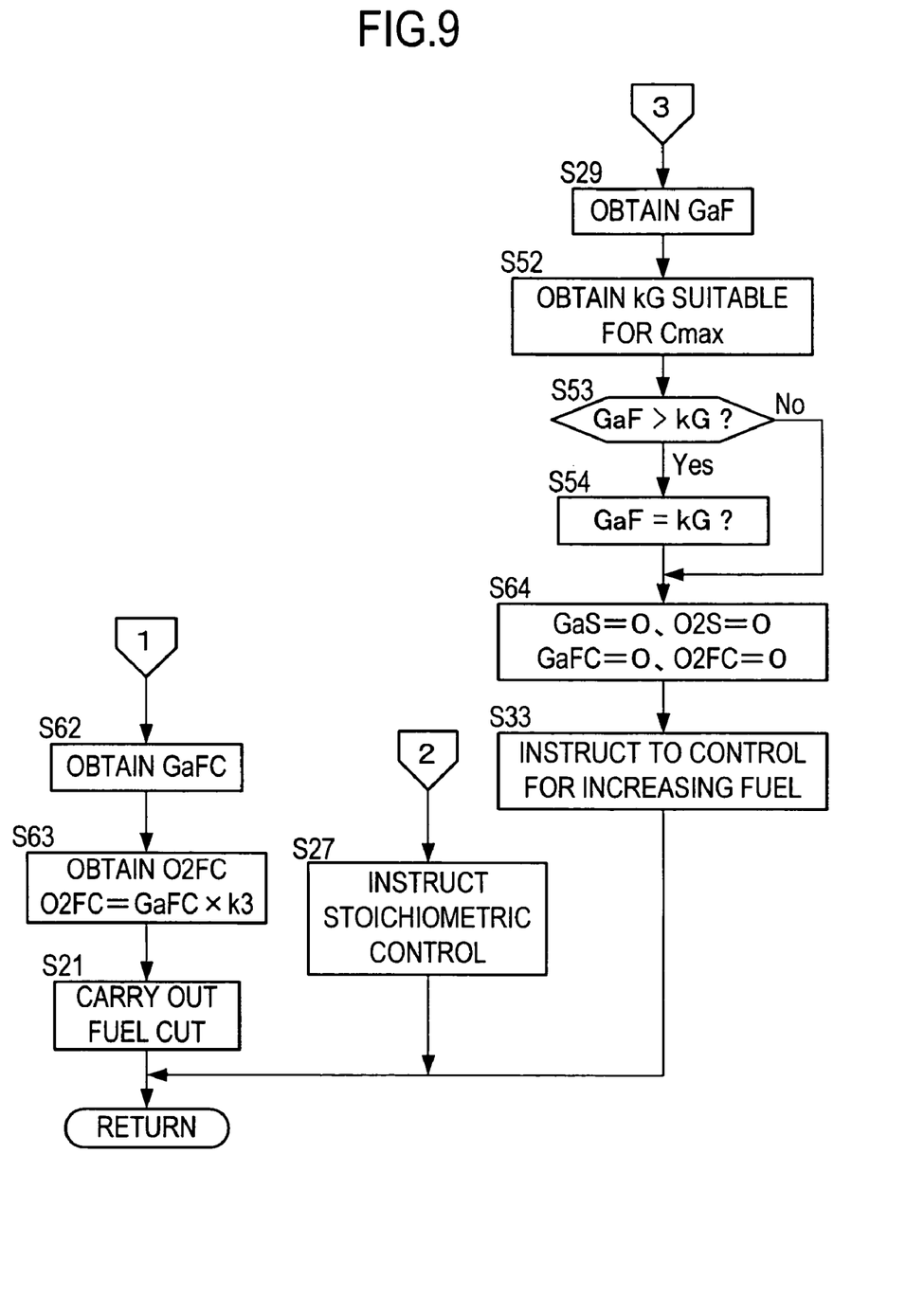
FIG. 9 is a flowchart following FIG. 8.

FIGS. 8 and 9 are flowcharts showing the third embodiment of the air-fuel ratio control routine carried out by the ECU 12. The air-fuel ratio control routine in FIGS. 8 and 9 is repeatedly carried out at predetermined intervals during operation of the internal combustion engine 1. In FIGS. 8 and 9, the same processing is designated with the same step numbers as that of the FIGS. 5 and 6, and explanation thereof will be omitted.

In the air-fuel ratio control routine in FIG. 8, the same processing as that of the control routine shown in FIG. 5 is carried out until the number of revolutions NE of the internal combustion engine 1 is obtained (step S14). In next step S61, the ECU 12 calculates the correction coefficient kgafc. The correction coefficient kgafc can be calculated by subtracting O2S and an amount O2FC of oxygen supplied to the catalyst 10 in a period during which the fuel cut is carried out. The amount O2FC can be obtained in later-described step S63, from a value obtained by multiplying GaF by k1. Thereafter, the same processing as that of the control routine shown in FIG. 5 is carried out until 1 is substituted into XFC (step S20). In next step S62 shown in FIG. 9, the ECU 12 obtains the total intake air amount GaFC of the internal combustion engine 1 during execution of the fuel cut. The GaFC can be obtained by totalizing the outputs of the air flow sensor 6 during the execution of the fuel cut. In next step S63, the ECU 12 obtains O2FC by multiplying GaFC by a coefficient k3. The coefficient k3 is set to a value capable of converting GaFC into O2S (e.g., 0.23 weight ratio of oxygen in air). Values of GaFC and O2FC are stored in the RAM of the ECU 12, and even if the current control routine has been completed, the last values are maintained until new values are substituted. In next step S21, the ECU 12 instructs to execute the fuel cut and then, the current control routine is completed. If a negative decision is made in step S12 or an affirmative decision is made in step S13, the same processing as that shown in FIG. 5 is carried out in step S24 and subsequent steps.

If it is determined that the fuel amount increasing condition is established in step S11, the same processing as that of the control routine in FIG. 6 is carried out until it is determined whether GaF is greater than kG (step S53 in FIG. 9). If it is determined that GaF is greater than kG, kG is substituted into GaF in step S54 and then, the procedure is proceeded to step S64. If it is determined that GaF is equal to or less than kG, step S54 is skipped and the procedure is proceeded to step S64. In step S64, the ECU 12 substitutes 0 into GaS, O2S, GaFC and O2FC to initialize the values. In next step S33, the ECU 12 instructs the internal combustion engine 1 to increase the fuel, and the current control routine is completed.

In the air-fuel ratio control routine in FIGS. 8 and 9, since kgafc is calculated using the amount of oxygen supplied to the catalyst 10 during the fuel cut, the period during which the fuel cut is executed can be shortened. Thus, it is possible to further suppress the deterioration of the catalyst 10.

The present invention is not limited to the above embodiments, and can be carried out in various modes. For example, the number of exhaust gas purifying catalysts disposed in the exhaust passage is not limited to one. Two or more exhaust gas purifying catalysts may be disposed in the exhaust passage. Means for obtaining the temperature of the exhaust gas purifying catalyst is not limited to the exhaust gas temperature sensor. The temperature of catalyst can also be estimated from the intake air amount, the number of revolutions, the air-fuel ratio, the ignition timing, the vehicle speed and the like. Thus, it is also possible to determine that the catalyst deterioration suppressing condition is established using the catalyst temperature estimated from these parameters.

The totalizing operation starting time obtained in the air-fuel ratio control routine may not be the same as the fuel increasing operation starting time. For example, the totalizing operation may be started after the output of the air-fuel ratio sensor is turned to the rich side. In this case, since GaF after the air-fuel ratio in the exhaust gas flowing into the exhaust gas purifying catalyst is turned into the rich side can be obtained, it is possible to more precisely obtain the amount of oxygen discharged from the exhaust gas purifying catalyst. Similarly, since the totalizing operation of the the GaS and GaFC is started while referring to the output of the air-fuel ratio sensor, the precision can be enhanced.

As is described in the above, according to the present invention, the operation of the fuel cut means is appropriately controlled in accordance with the amount of oxygen discharged from the exhaust gas purifying catalyst at the time of fuel increasing operation. Therefore, it is possible to allow the exhaust gas purifying catalyst to occlude the oxygen at the time of deceleration of the internal combustion engine while suppressing the deterioration of the exhaust gas purifying catalyst, and to suppress the generation of catalyst exhaust gas ($H_2S$).

What is claimed is:

1. An air-fuel ratio control apparatus of an internal combustion engine in which an exhaust gas purifying catalyst is disposed in an exhaust passage, comprising: fuel cut means which stops fuel supply to the internal combustion engine when it is determined that a number of revolutions of the internal combustion engine is higher than a fuel cut number of revolutions at the time of deceleration of the internal combustion engine, the fuel cut number of revolutions being set as a number of revolutions of the internal combustion engine for determining whether a stop of the fuel supply should be started; and changing means of the fuel cut number of revolutions for changing the fuel cut number of revolutions according to a physical amount which correlates with an amount of oxygen discharged from the & exhaust gas purifying catalyst during a fuel increasing operation of the internal combustion engine such that as the amount of oxygen is greater, the fuel cut number of revolutions is reduced.

2. The air-fuel ratio control apparatus of the internal combustion engine according to claim 1, wherein the changing means of the fuel cut number of revolutions refers to a total intake air amount of the internal combustion engine during the fuel increasing operation as the physical amount, and changes the fuel cut number of revolutions according to the total intake air amount such that as the total intake air amount is greater, the fuel cut number of revolutions is reduced.

3. The air-fuel ratio control apparatus of the internal combustion engine according to claim 1, wherein the changing means of the fuel cut number of revolutions refers to, as the physical amount, a period during which the fuel increasing operation is carried out, and changes the fuel cut number of revolutions according to the period such that as the period is longer, the fuel cut number of revolutions is reduced.

4. The air-fuel ratio control apparatus of the internal combustion engine according to claim 1, wherein the changing means of the fuel cut number of revolutions refers to an air-fuel ratio at the time of the fuel increasing operation as the physical amount, and changes the fuel cut number of revolutions such that as a change of the air-fuel ratio toward a rich side is greater, the fuel cut number of revolutions becomes smaller.

5. The air-fuel ratio control apparatus of the internal combustion engine according to claim 1, wherein the changing means of the fuel cut number of revolutions corrects the fuel cut number of revolutions according to an amount of oxygen supplied to the exhaust gas purifying catalyst after completing the fuel increasing operation such that as the amount of oxygen supplied to the exhaust gas purifying catalyst is greater, the fuel cut number of revolutions is increased.

6. The air-fuel ratio control apparatus of the internal combustion engine according to claim 1, wherein the changing means of the fuel cut number of revolutions corrects the fuel cut number of revolutions according to a maximum oxygen occluding amount of the exhaust gas purifying catalyst such that as the maximum oxygen occluding amount is greater, the fuel cut number of revolutions is reduced.

* * * * *